(12) United States Patent  (10) Patent No.: US 8,788,873 B2
Galles et al.  (45) Date of Patent: Jul. 22, 2014

(54) SERVER INPUT/OUTPUT FAILOVER DEVICE SERVING HIGHLY AVAILABLE VIRTUAL DEVICES

(75) Inventors: Michael B. Galles, Los Altos, CA (US); Luca Cafiero, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 590 days.

(21) Appl. No.: 13/086,595

(22) Filed: Apr. 14, 2011

(65) Prior Publication Data

US 2012/0265910 A1 Oct. 18, 2012

(51) Int. Cl.
*G06F 11/00* (2006.01)

(52) U.S. Cl.
USPC .......... 714/4.11; 709/217; 707/648; 707/649; 711/114; 714/4.1

(58) Field of Classification Search
USPC .................. 711/114; 709/217; 707/648, 649; 714/4.1, 4.11
See application file for complete search history.

(56) References Cited

U.S. PATENT DOCUMENTS

| | | | |
|---|---|---|---|
| 5,751,967 A * | 5/1998 | Raab et al. | 709/228 |
| 6,574,663 B1 * | 6/2003 | Bakshi et al. | 709/223 |
| 7,039,828 B1 * | 5/2006 | Scott | 714/4.11 |
| 7,076,564 B2 * | 7/2006 | To et al. | 709/238 |
| 7,467,191 B1 * | 12/2008 | Wang et al. | 709/221 |
| 7,734,947 B1 * | 6/2010 | Frangioso et al. | 714/4.1 |
| 7,752,360 B2 | 7/2010 | Galles | |
| 7,937,438 B1 * | 5/2011 | Miller et al. | 709/203 |
| 7,949,893 B1 * | 5/2011 | Knaus et al. | 714/4.1 |
| 2004/0037322 A1 * | 2/2004 | Sukonik et al. | 370/476 |
| 2004/0210623 A1 * | 10/2004 | Hydrie et al. | 709/201 |
| 2008/0192648 A1 | 8/2008 | Galles | |
| 2011/0022695 A1 * | 1/2011 | Dalal et al. | 709/222 |
| 2013/0073711 A1 * | 3/2013 | Hanka et al. | 709/223 |

OTHER PUBLICATIONS

Rekhter, "A Border Gateway Protocol 4 (BGP-4)", 1995, IBM, p. 1-50.*
PCI Standard Hot-plug Controller and Subsystem Specification, Revision 1.0 SHPC Extensions for PCI-X 2.0 ECN, Feb. 27, 2003, pp. 1-39.

* cited by examiner

*Primary Examiner* — Joshua P Lottich
*Assistant Examiner* — Jeison C Arcos
(74) *Attorney, Agent, or Firm* — Edell, Shapiro & Finnan, LLC (57) ABSTRACT

A failover input/output device and corresponding method are provided to manage failover events of input/output controller devices that operate in accordance with a computer expansion card standard, such as the Peripheral Component Interconnect Express (PCIe) standard. The failover input/output device connects to redundant first and second virtualized input/output controller devices each comprising multiple virtual network interfaces that are in an active or standby state at any given time, and to a computing device that hosts one or more processes. The failover input/output device broadcasts transactions in accordance with the computer expansion card standard initiated from the computing device to the first and second virtualized input/output controller devices. The failover input/output device receives signals associated with upstream transaction completions in accordance with the computer expansion card standard for both active and standby virtual network interfaces on the first and second virtualized input/output controller devices. The failover input/output device forwards signals associated with upstream transaction completions for active virtual network interfaces on the first and second virtualized input/output controller devices to the computing device.

22 Claims, 7 Drawing Sheets

┌─────────────────────────────────────────────────────────────┐
│ Notify non-failing IO controller device via a downstream PCIe│
│ transaction that it is the working IO controller device (non-failing IO │— 242
│ controller device changes all vNICs to active state and enables any │
│ DMA rings that were previously disabled) │
└─────────────────────────────────────────────────────────────┘
                            ↓
┌─────────────────────────────────────────────────────────────┐
│ Notify failing IO controller device that it has been switched to failing status │— 244
└─────────────────────────────────────────────────────────────┘
                            ↓
┌─────────────────────────────────────────────────────────────┐
│ Check pending transaction table for any downstream active read │
│ transactions; return any response marked standby to host; discard │— 246
│ any future responses from failing IO controller device │
└─────────────────────────────────────────────────────────────┘
                            ↓
┌─────────────────────────────────────────────────────────────┐
│ PCIe protocol switchover is complete; discard any completions due to │— 248
│ requests made before the failover │
└─────────────────────────────────────────────────────────────┘

SERVER INPUT/OUTPUT FAILOVER DEVICE SERVING HIGHLY AVAILABLE VIRTUAL DEVICES

TECHNICAL FIELD

The present disclosure relates to input/output devices used in virtual computing environments.

BACKGROUND

In an enterprise computing environment, host servers running one or more processes communicate with other devices in a network via input/output devices that are configured to provide redundancy services. For example, the host server devices connect to input/output modules in accordance with a computer expansion card standard, such as the Peripheral Component Interconnect Express (PCIe) standard.

Achieving input/output device redundancy using commodity servers and operating systems is a complex problem that has not been satisfactorily solved. For example, PCIe device failure or "hot" removal will cause most servers to hang or crash. Some servers require specialized driver software to manage failover events, and even these configurations will hang or crash host servers if there are incomplete transactions or lost input/output write credits.

DESCRIPTION OF EXAMPLE EMBODIMENTS

Overview

A failover input/output device and corresponding method are provided to manage failover events of input/output controller devices that operate in accordance with a computer expansion card standard, such as the Peripheral Component Interconnect Express (PCIe) standard. The failover input/output device connects to redundant first and second virtualized input/output controller devices each comprising multiple virtual network interfaces that are in an active or standby state at any given time, and to a computing device that hosts one or more processes. The failover input/output device broadcasts transactions in accordance with the computer expansion card standard initiated from the computing device to the first and second virtualized input/output controller devices. The failover input/output device receives signals associated with upstream transaction completions in accordance with the computer expansion card standard for both active and standby virtual network interfaces on the first and second virtualized input/output controller devices. The failover input/output device forwards signals associated with upstream transaction completions for active virtual network interfaces on the first and second virtualized input/output controller devices to the computing device.

Example Embodiments

Figure 1:
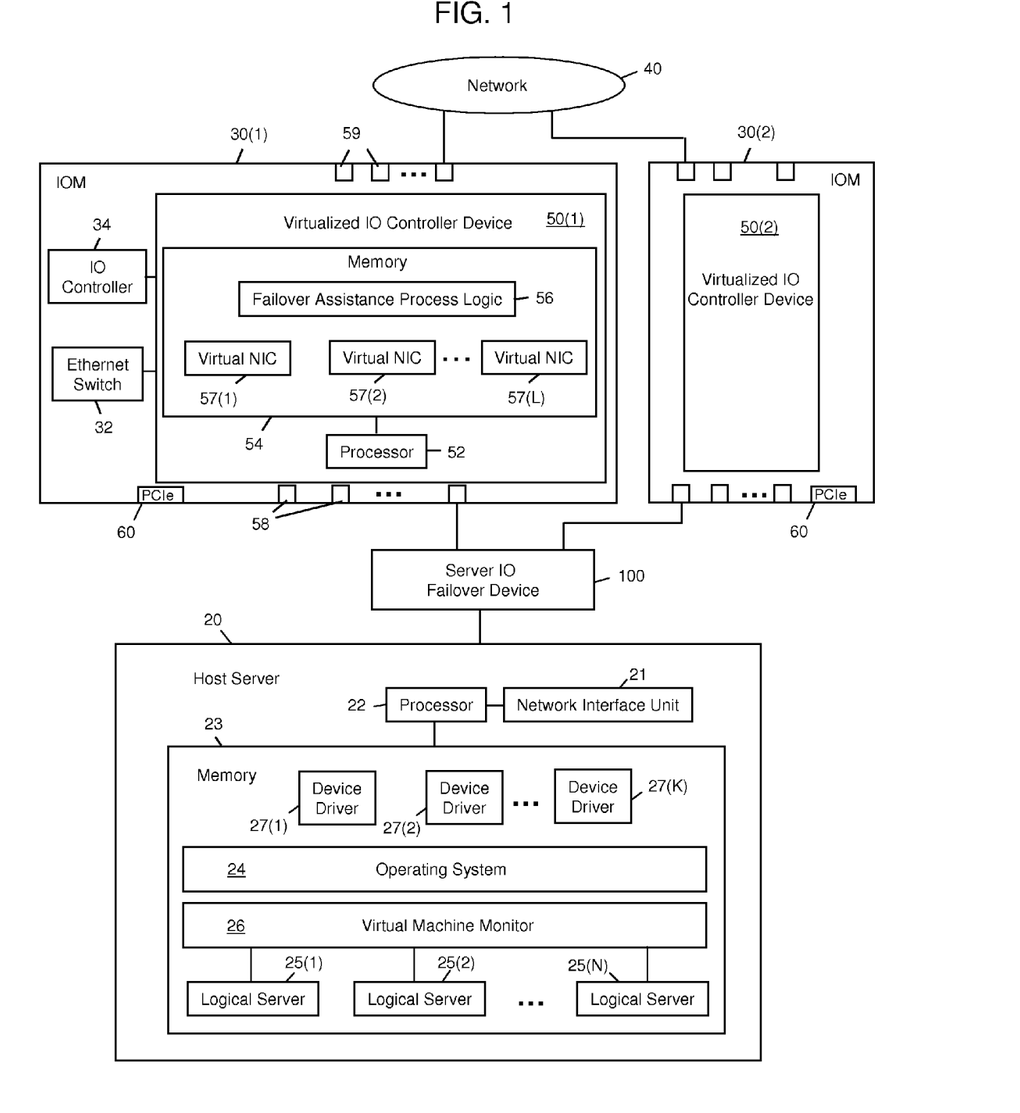
FIG. 1 is a block diagram of an example system in which an input/output failover device connects between redundant first and second virtualized input/output controller devices and a host computing device.

Referring first to FIG. 1, a block diagram is shown for a system 10 in which a host server 20 connects to first and second input/output (IO) modules (IOMs) 30(1) and 30(2), which in turn are connected to a network 40, e.g., a local area network or wide area network. On the IOMs 30(1) and 30(2), there is a virtualized IO controller device 50(1) and 50(2), respectively. Virtualized IO controller devices 50(1) and 50(2) are redundant first and second virtualized IO controller devices and they server to consolidate IO with respect to the host server 20. For example, the IO controller devices 50(1) and 50(2) are configured to implement a computer expansion card standard, such as the Peripheral Component Interconnect Express (PCIe) standard. In one form, the IO controller devices 50(1) and 50(2) are implemented as Application Specific Integrated Circuits (ASICs) and are capable of connecting to multiple host servers (although only one host server is shown in FIG. 1 for simplicity).

The sudden loss of an IO controller devices due to hardware failure or a "hot" unplug event can cause the attached servers to hang or crash. This is made more acute by the fact that one IO controller devices can connect to multiple host servers (e.g., 8 server blades), thus a failure or hot unplug of one IO controller devices can crash up to 8 servers.

Accordingly, an IO failover device 100 is provided to connect between the host server 20 and first and second redundant IO controller devices 50(1) and 50(2) on IOMs 30(1) and 30(2), respectively. As will become more apparent hereinafter, the IO failover device 100 supports active PCIe link failover in a way that is not visible to the operating system of a host server 20. An IO controller device in an IOM can be removed or replaced at any time with no warning and the operating system(s) of the host servers will continue running without interruption; no hot plug support is required of the operating system or of the applications. While FIG. 1 shows a single host server 20 connected to the IO failover device 100, this is only an example and there are embodiments described hereinafter in which multiple host servers can connect to a single IO failover device 100.

The techniques described herein do not require a virtual computing environment in the sense that a hypervisor is required. For example, these techniques can be used on a machine running an ordinary Windows® or Linux® operating system, or it can be used with a hypervisor. In other words, these techniques do involve the virtualization of IO devices, but do not require the virtualization of compute or operating systems. When a single host operating system is involved, the processes running on the host computing device need not be virtual machine processes and the operating system may be an ordinary operating system.

Still referring to FIG. 1, some of the basic components of the host server 20 and IO controller devices 50(1) and 50(2) are now described. The host server 20 comprises a network interface unit 21, a central processor 22 and a memory 23. In memory 23, software instructions are stored for a variety of functions performed by the host server 20. For example, instructions are stored in memory 23 for an operating system (OS) 24, a plurality of virtual machine processes (logical servers) 25(1)-25(N), a virtual machine monitor 26, and device drivers 27(1)-27(K). The virtual machine monitor 26 allocates computing resources of the processor 22 and working memory to the virtual machine processes 25(1)-25(N). The device drivers 27(1)-27(K) are software drivers that enable the host server 20 to operate with peripheral devices, including the IO controller devices 50(1) and 50(2) and the IO failover device 100. For example, device driver 27(1) is associated with a vNIC on an IO controller device, device driver 27(2) is associated with another vNIC, etc. Again, while FIG. 1 shows that the host server 20 executes virtual machine processes, this is only an example, and more generally, the host server 20 may execute processes that are not necessarily virtualized.

Each IOM 30(1) and 30(2) comprises an Ethernet switch 32 and a controller 34 both of which connect to the IO controller device on the respective IOM. The IO controller devices 50(1) and 50(2) are identical. For the sake of simplicity, only the IO controller device 50(1) is shown and described in detail. The IO controller device 50(1) comprises a processor 52, memory 54 that stores instructions for failover assistance process logic 56 and instructions for a plurality of virtual network interface cards (vNICs) 57(1)-57(L), and a plurality of connection ports 58. In addition, the IO controller device 50(1) comprises a plurality of Ethernet ports 59, e.g., 10 GE ports, that are configured to enable communications over the network 40. Operation of the failover assistance process logic 56 is described hereinafter in connection with FIG. 7.

FIG. 1 also shows an additional downstream PCIe port 60 on each IOM 30(1) and 30(2). The PCIe port 60 can be used to connect to various physical devices, such as a data storage device. For example, such physical devices may serve as Single-Root IO Virtualization (SR-IOV) devices. The IO failover device 100 may be configured to provide a failover between two physical devices (e.g., two storage devices) plugged into respective ones of the IOMs 30(1) and 30(2) at PCIe ports 60. For example, upon failover of a first physical device connected at the PCIe port 60 of the first IOM 30(1), the IO failover device 100 directs signals associated with transactions for the first physical device to the second IOM 30(2) where a similar second physical device is connected at PCIe port 60.

Figure 2:
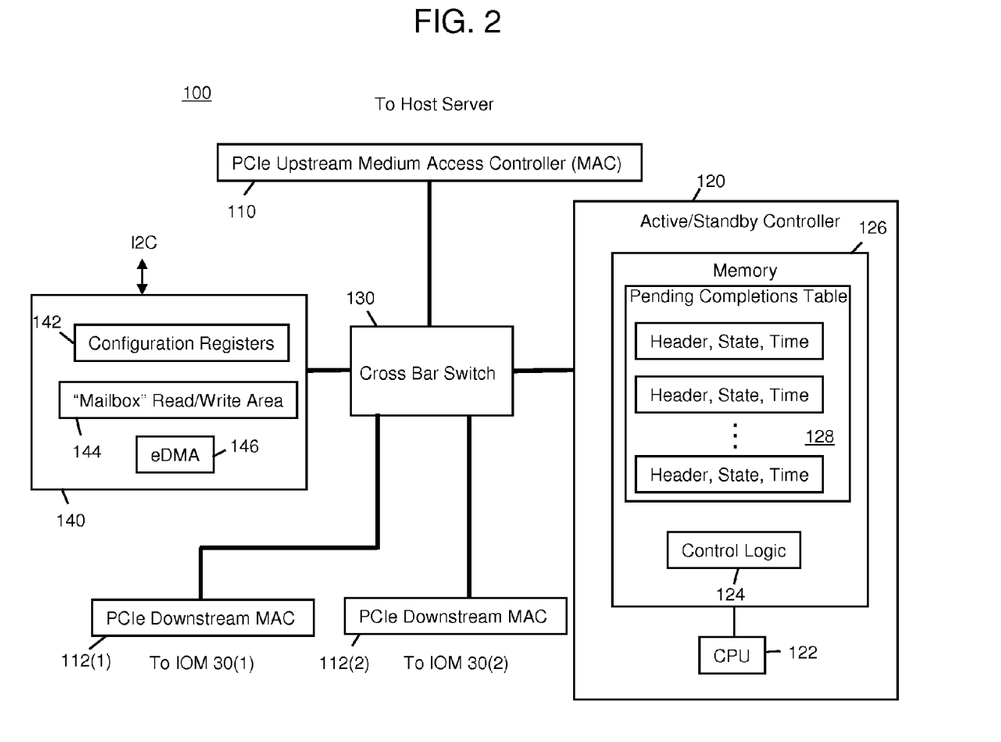
FIG. 2 is an example of a block diagram of the input/output failover device.

The IO failover device 100 handles the situation of planned or unplanned removal or component failure of an IO controller device on an IOM 30(1) or 30(2). Reference is now made to FIG. 2 for a description of a block diagram of the IO failover device 100. The IO failover device may be implemented in an ASIC that provides electrical and functional failure isolation at the PCIe level. The OS on the host server that connects to its IO subsystems through this IO failover device 100 can continue uninterrupted operation if any one of the redundant physical devices fails. As explained above, the IO controller devices 50(1) and 50(2) are redundant physical devices that perform virtualized IO controller operations and that support a failover protocol, although this protocol is not exposed to the host server.

As shown in FIG. 2, the IO failover device 100 comprises a PCIe upstream medium access controller (MAC) facing upstream that serves as a connection port to a host server, e.g., host server 20 shown in FIG. 1. There are also PCIe downstream MACs 112(1) and 112(2) facing downstream that serve as connection ports to the IOMs 30(1) and 30(2), respectively, on which the IO controller devices 50(1) and 50(2), respectively, reside.

An active/standby controller 120 is provided that serves as the control unit for the IO failover device 100. The active/standby controller 120 connects to a cross bar switch 130 that in turn connects to the PCIe upstream MAC 110 and the PCIe downstream MACs 112(1) and 112(2). There is also a memory 140 allocated to store configuration information. The upstream MAC 110 and downstream MACs 112(1) and 112(2) are enumerated by the host server according to the PCIe standard, and include minimal registers (not shown) to control a PCIe switch port. These registers control only parameters related to the local PCIe MAC.

The active/standby controller 120 comprises a CPU 122 and control logic instructions 124 that the CPU 122 executes to perform control functions for the IO failover device 100. The operations of the CPU 122 and control logic 124 may be implemented by suitably configured digital logic gates as opposed to a dedicated CPU and associated control logic. In addition, the active/standby controller 120 comprises memory 126 that stores data for a pending transactions completions table(s) 128. The pending transactions completions table 128 stores data for all pending transactions on behalf of host server that require completions by a vNIC on an IO controller device on an IOM 30(1) and 30(2). Thus, the pending transactions completions table 128 tracks all pending transactions that require completions. The pending transactions completions table 128 stores entries 129(1)-129(P) for a plurality of pending transactions, each of which comprises header information describing the PCIe transaction, e.g., type: memory read, IO read, or configuration read; 64 bit address; size of transaction, in bytes; special flag, state information indicating whether the transaction was forwarded to each IOM, the time the transaction was issued, active and standby response status and response data, and any error or status flags associated with the transaction, and time information indicating the time that the pending completion was written into the table (for purposes of time-out determination).

As explained further hereinafter, there may be one or more active vNICs and one or more standby vNICs on each of the first and second IO controller devices 50(1) and 50(2) on IOMs 30(1) and 30(2). This follows from the inherent redundancy of the first and second IO controller devices and load-balancing performed across the first and second IO controller devices. When an active vNIC responds to a transaction from the host server, the IO controller device on which that vNIC is implemented clears a standby bit in the PCIe response transaction layer packet (TLP) that it sends and which is received by the IO failover device 100. When a standby vNIC responds to a transaction from the host server, the IO controller device on which that vNIC is implemented sets the standby bit in the PCIe response TLP that it sends and which is received by the IO failover device 100. Upon a failover event, pending transactions that have a standby response buffered with no active response will return the standby response to the host and clear the pending table entry. The control logic 124 is configured to initiate a failover event if it waits longer than a programmable timeout period for an active response to be returned from the vNIC. Standby response timeouts can also occur, i.e., if the standby vNIC fails to provide a standby response within a timeout period, both IO controllers are notified. If the pending transaction table 128 is full, no new transactions are accepted from the host PCIe upstream MAC 110, and it is flow-controlled by withholding PCIe non-posted credits until space in the table 128 is available.

The cross bar switch 130 is a switch device that is controlled by the controller 120 to re-direct signals depending on the status of an IO controller device. The cross bar switch 130 is configured to direct signals associated with transactions between the PCIe upstream MAC 110 (to and from the host server) and the PCIe downstream MACs 112(1) and 112(1) (to and from the redundant first and second IO controller devices). When a failover event occurs, the active/standby controller 120 controls the cross bar switch 130 to direct signals that were previously sent to the failed IO controller instead to the non-failed IO controller and thereby move any active vNICs on the failed IO controller to the non-failed IO controller.

The memory 140 serves as a storage unit for configuration information associated with the operation of the IO failover device 100. Read/write access to the configuration space of memory 140 is, for example, by way of an I2C slave interface. This bus is typically attached to a system management bus, allowing initial access and debug access before the PCIe interfaces are available.

In addition to the MAC configuration registers visible to the host server, there are several configuration registers shown at 142 that are "visible" only to the downstream IO controllers 50(1) and 50(2). The configuration registers 142 are accessed by the processors of the IO controller devices 50(1) and 50(2) via upstream read/write transactions. Access to these configuration registers 142 are not passed up to the host server.

Examples of configuration registers 142 are shown in the table below.

| Register | Description |
| --- | --- |
| pause_host_requests | Temporarily stop new hosts requests from entering the cross bar switch. For a controller failover, it is desirable to flow control new hosts requests to make a cleaner transition, but this is not required for surprise events. |
| timeout_control | Set the maximum time a request can be pending to the active vNIC before a failover event is triggered. Also can enable/disable timeouts. |
| pending_completions | Read access to the pending completion table. |
| mailbox | A large byte array available with read/write access to IO controllers. |
| downstream_doorbell | A mechanism to send a doorbell notification between active and standby IO controllers. |
| <edma interface> | All registers exported by standard eDMA engine. |

The memory 140 further comprises a read/write area 144 to allow the attached IO controller devices 50(1) and 50(2) to communicate with each other. The processor in each IO controller devices 50(1) and 50(2) can directly write or read the mailbox area, then write the doorbell register to notify its peer that a mailbox message is waiting. Mailbox messages can be used to store data representing states of the first and second IO controller devices 50(1) and 50(2) to allow them to synchronize their states (across multiple IO controller devices) to plan failover events and to send maintenance messages.

The Direct Memory Access (eDMA) area 146 is used for copying large memory regions between the failover device and the IO controllers. This is a convenient mechanism for software to move data without requiring synchronous CPU read and write operations.

The memory 23 in host server 26, memory 54 in the IO controller devices 50(1) and 50(2), and memory 140 in the IO failover device 100 may comprise read only memory (ROM), random access memory (RAM), magnetic disk storage media devices, optical storage media devices, flash memory devices, electrical, optical, or other physical/tangible memory storage devices. Thus, in general, the memory devices described herein may comprise one or more computer readable storage media (e.g., a memory device) encoded with software comprising computer executable instructions and when the software is executed it is operable to perform the operations described herein.

Figure 3:
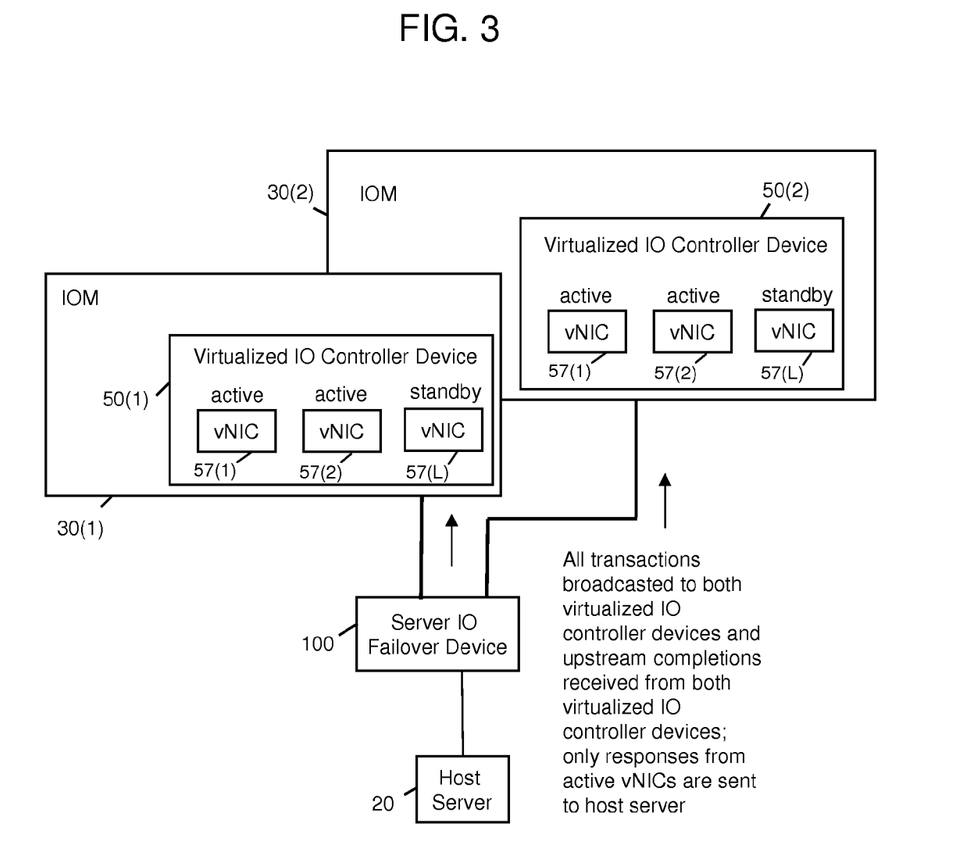
FIG. 3 is an example of a diagram depicting the broadcasting of transactions from the input/output failover device to the first and second virtualized input/output controller devices.

Reference is now made to FIG. 3. FIG. 3 shows how the IO failover device 100 couples between the host server 20 and the virtualized IO controller devices 50(1) and 50(2) on IOMs 30(1) and 30(2), respectively. FIG. 3 also shows that on both of the virtualized IO controller devices 50(1) and 50(2), there are one or more vNICs that are active and one or more vNICs that are in standby. On a per vNIC basis, the virtualized IO controller devices 50(1) and 50(2) choose one IO controller device as being active and one as standby for a given vNIC. Since multiple vNICs are active at any given time, active-active operation can be achieved by load-balancing the active vNICs devices across the redundant virtualized IO controller devices 50(1) and 50(2). For example, FIG. 3 shows that vNICs 57(1) and 57(2) in virtualized IO controller device 50(1) are active and vNIC 57(L) is in standby and vNICs 57(1) and 57(2) in virtualized IO controller device 50(2) are in standby and vNIC 57(L) is active. The IO failover device 100 connects to the host server PCIe root complex on its upstream port and to the dual redundant virtualized IO controllers 50(1) and 50(2) on its downstream ports. As explained further hereinafter, all transactions initiated from the host server 20 are broadcast to both virtualized IO controllers, resulting in identical PCIe topologies and configurations in both virtualized IO controllers.

Figure 4:
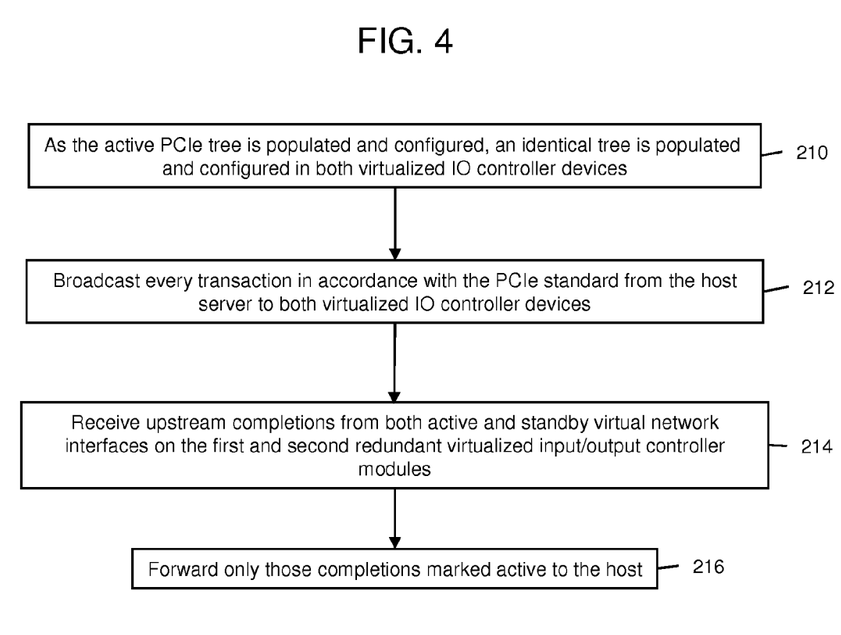
FIG. 4 is a flow chart showing examples of operations performed by the input/output failover device prior to a failover event.

Reference is now made to FIG. 4 in connection with FIG. 3. FIG. 4 shows a flow chart depicting operations of the IO failover device 100 that occur during boot time and prior to a failover event. These operations are performed by the control logic 124 of the active/standby controller 120 in the IO failover device.

At boot time, the host server 20 enumerates its PCIe busses, finding the active virtual PCIe tree and assigning Bus, Device and Function (BDF) numbers, Base Address Registers (BARs), interrupt tables, and other resources as is normally performed in accordance with the PCIe standard. The IO failover device 100 appears as a 2-port switch near the top of the PCIe tree. At 210, as the active PCIe tree is populated and configured during boot time, the IO failover device 100 populates both virtualized IO controller devices 50(1) and 50(2) with identical PCIe tree information. In this way, both virtualized IO controller devices 50(1) and 50(2) are configured identically. Said more generally, operation 210 involves forwarding tree information generated in accordance with a computer expansion card standard by a host computing device during boot time to first and second virtualized IO controllers.

Each IO controller device 50(1) and 50(2) is aware of the active and standby states of its vNICs and therefore does not enable any associated virtual device DMA engines for vNICs that are in a standby state. For example, each virtualized IO controller device 50(1) and 50(2) programs its virtualization tables to accept all configuration cycles and interrupt control cycles, but the standby vNICs remain disabled. The result is two identically configured PCIe trees, one active and one standby for each vNIC.

At 212, the IO failover device 100 broadcasts every transaction in accordance with the PCIe standard from the host server 20 to both virtualized IO controller devices 50(1) and 50(2) and accepts upstream completions from both active and standby vNICs of the virtualized IO controller devices 50(1)

and 50(2). This broadcasting operation is performed from boot-up (time 0) onwards and even during PCIe enumeration.

At 214, the IO failover device 100 receives signals associated with upstream completions in accordance with the PCIe computer expansion card standard from both active and standby vNICs on the first and second IO controller devices 50(1) and 50(2). Some of these upstream completions responses will be marked "active" if sent from an active vNIC and some of these upstream completions responses will be marked "standby" if sent from a standby vNIC. At 216, the IO failover device forwards upstream completion responses that are marked "active" to the host server 20.

The standby PCIe tree maintains an identical configuration throughout operation as it receives all configuration cycles from the host server. However, the internal states of individual vNICs are not the same because vNICs in standby are not participating in active packet transmit/receive of packets. The DMA engines for standby vNICs are not enabled and therefore they cannot and do not keep identical DMA ring state or interrupt assertion state.

Software may distribute active vNICs alternately across the two virtualized IO controller devices for load-balancing purposes. In the event of a failover, the IO failover device will cause any vNICs which were active on the failing virtualized IO controller device to the non-failing virtualized IO controller device. vNICs which were active on the non-failing virtualized IO controller device are not affected and continue normal operation.

As is evident from the foregoing, there are functions in the IO controller devices 50(1) and 50(2) to fully support failover operations described herein. First, each IO controller device stores a vNIC table that includes an active/standby bit to indicate whether a particular vNIC is active or in standby. Second, the IO controller device includes in upstream completion events the active/standby bit as one of the PCIe header reserved bits. Additional special active/standby bits in the interrupt configuration table may help the interrupt failover process. In addition, a special "debug vNIC" window may be provided that can only be accessed by the IO failover device via the peer IO controller device. The active/standby marking bits and other special signaling bits used between the IO failover device and each IO controller are never forwarded to the host, but rather are masked out of completions so the host is not aware of the markings.

Figure 5:
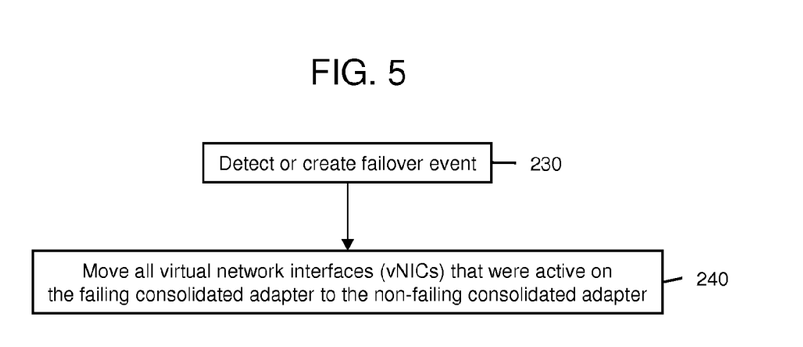
FIG. 5 is a flow chart of operations performed by the input/output failover device upon a failover event.

Reference is now made to FIG. 5 for a description of high level operations performed by the IO failover device 100 upon a failover event. At 230, the IO failover device detects a failover event. A failover event may be detected or may be created. For example, a failover of a virtualized IO controller device may be a "surprise" due to a component failure or unplanned removal of a virtualized IO controller device, or it may be planned. Detection of a "surprise" failure resulting from a component failure of a virtualized IO controller device may be detected from one or more of: a loss of link on a downstream active port to an IO controller device; the downstream active port experiences a pending completion timeout event based on the information stored in the pending transactions completion table in the IO failover device (that is, failure to receive a response to a pending transaction completion from either IO controller device); and receipt of an explicit failover message from either IO controller device. In the latter case, an IO controller device may be configured to send an explicit failover message if the management system has requested a failover, or an IO controller device may be configured with other capabilities to detect that the other IO controller device is not responsive.

The IO controller devices 50(1) and 50(2) can affect a planned failover event at any time for an individual vNIC. The IO failover device 100 does not need to be informed of planned failover events. The two IO controller devices 50(1) and 50(2) coordinate the planned failover and sequence the per vNIC active/standby bit setting with the host driver notification event. Planned failover events may also be used by software to apply firmware upgrades to each IO controller device in turn.

Still referring to FIG. 5, at 240, in the event of a failover, the IO failover device 100 will cause any vNICs which were active on the failing IO controller device to move to the non-failing IO controller device. vNICs which were active on the non-failing IO controller device are not affected and continue normal operation. That is, the IO failover device 100, in response to a failover event of one IO controller device, e.g., IO controller device 50(1), forwards signals associated with upstream transaction completions for standby virtual network interfaces from the other IO controller device, e.g., IO controller device 50(2), to the host server 20. As a result, one or more vNICs on the second IO controller device 50(2) are made active to replace one or more vNIC interfaces on the first IO controller device 50(1).

Figure 6:
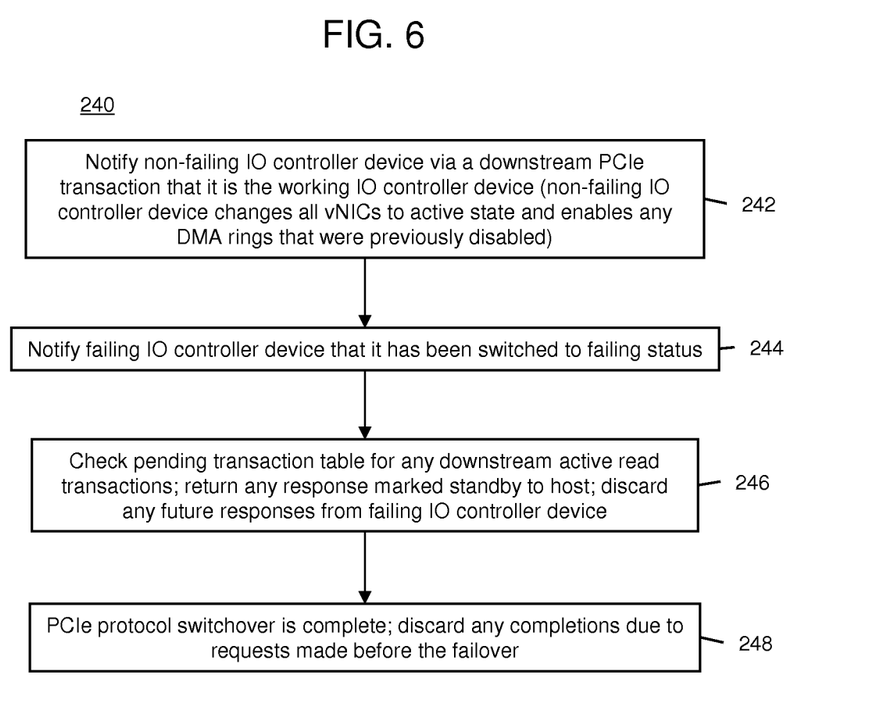
FIG. 6 is a flow chart showing in more detail operations performed by the input/output failover device upon a failover event.

Reference is now made to FIG. 6 for a more detailed description of the operation 240 associated with moving active vNICs on a failing IO controller device to a non-failing IO controller device. At 242, the IO failover device 100 sends a downstream PCIe transaction to the non-failing IO controller device to notify it that it is the working IO controller device. In response to receiving this notification, the non-failing IO controller device changes all vNICs to active state due to the standby status. It is up to the host driver to enable rings once they are disabled due to an active/standby failover event. After the host driver has soft reset a vNIC, it will enable the rings and operation will continue. The non-failing IO controller device is now ready to handle any BAR or configuration cycle transactions from the host server. At 244, the IO failover device 100 also sends a notification to the failing IO controller that it has been moved to the failed status.

At 246, the IO failover device checks its pending transaction completion table for any downstream active read transactions. If a pending transaction has a response marked as standby, the response is returned to the host server and the transaction is cleared. Any future responses from the failing IO controller device are considered spurious and discarded. In other words, the IO failover device 100 stores data representing pending transaction completions with respect to vNICs on the first and second IO controller devices 50(1) and 50(2), and for any pending transaction completion for a standby vNIC, the IO failover device forwards the corresponding response to the computing device.

At 248, PCIe switch over to the non-failing IO controller device is completed and any transaction completions due to requests made before the failover are discarded using information in its pending read table.

After a failover, the host server can continue to operate normally as it has not lost any PCIe requests or completions and there is no change to its BDF, BAR, interrupt, or other configuration parameters. However, the individual vNICs will have lost their DMA ring state and interrupt assertion state as a result of the failover. The vNIC DMA ring state needs to be brought in sync with the host driver state. On a failover event, the working IO controller device performs the operations shown in FIG. 7 to sync the active state of any vNIC that was previously in a standby state prior to the failover. These operations are performed by the failover assistance process logic 56 in the IO controller device, referred to in connection with FIG. 1.

Figure 7:
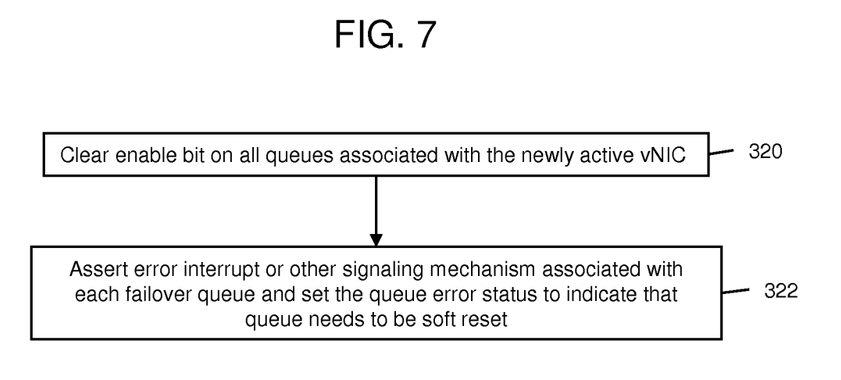
FIG. 7 is a flow chart showing examples of operations performed by a virtualized input/output controller device for newly active virtual network interfaces.

Reference is now made to FIG. 7. At 320, the processor in the IO controller device clears the enable bit on all queues (write queue, read queue, clear queue) associated with the newly active vNIC. This prevents operations before the host driver has synchronized state. At 322, the processor in the IO controller device asserts the error interrupt (or similar signaling mechanism) associated with each failover queue and sets the queue error status to indicate that the queue needs to be soft reset. In response, the host drivers see the soft reset error interrupt and proceed to clear and re-post all descriptor rings. Once the new ring is allocated and posted the queues are enabled and packets begin to flow normally again.

Any packets which were in flight during the failover event are lost, but this is acceptable. The drivers restart DMA operation under an identical configuration and the host OS and applications continue operation without interruption.

The IO controller device keeps per Logical Interface (LIF) statistics on packet counts, sizes, errors, etc. In this context, the statistics are a count of all transmit and receive packets and bytes, kept on a per vNIC basis. When a failover event occurs, the standby IO controller device should reflect the latest statistics that are presented to the host driver. There are two methods the software can use to synchronize statistics. One option is to have the active IO controller device send the current active statistics counts for all its LIFs to the standby IO controller device (or to the IO failover device's memory space) periodically, e.g., every 5 to 30 seconds. A failover event will result in some loss as any packets sent or received since the last update will not be reflected. Another option is to have the host driver push down its current statistics counters on a failover event. When the driver receives a failover or soft DMA reset notification, it can push its last record of the LIF statistics down to the processor of the IO controller device, which will set the local LIF statistics accordingly.

Figure 8:
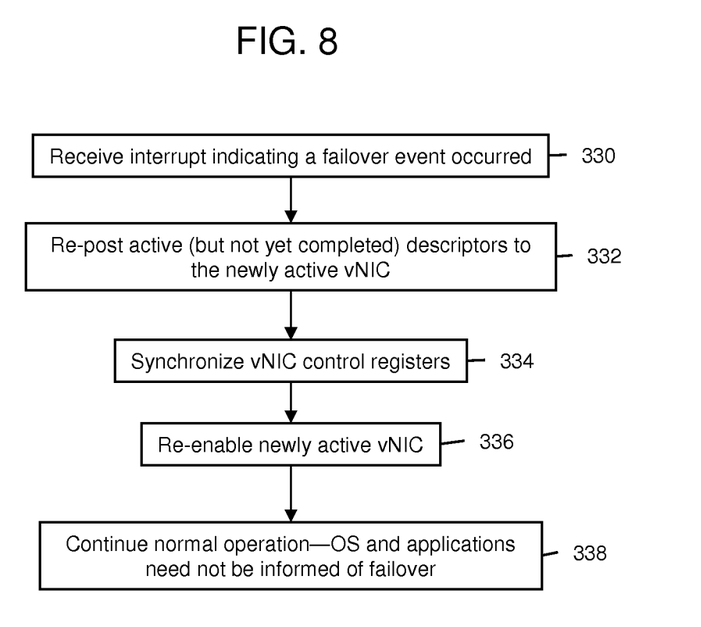
FIG. 8 is a flow chart depicting examples of operations performed by driver software in a host computing device when a failover event occurs.

Reference is now made to FIG. 8 for a description of operations of a host driver for an IO controller device, and in particular, the operations of the host driver when a failover occurs. At 330, the host driver receives an interrupt sent from the IO controller device indicating that a failover event has occurred. At 332, the host driver re-posts active (but not yet completed) descriptors to the newly active vNIC. At 334, the host driver synchronizes the newly active vNIC control registers, meaning it writes current values to the vNIC control registers. At 336, the host driver re-enables the newly active vNIC. At 338, the host driver continues normal operation and the OS and applications running on the host server need not be informed of the failover event.

After failover, the new active vNICs will have all the correct DMA ring state as far as ring pointers, posted index, and any other information that comes from the host since this information was broadcast to the IO controller device while it was in standby for a particular vNIC. However, this IO controller device does not know the proper fetch index. In other words, it does not know where the old master was when the failover happened. In one example, there is a lighter weight driver failover process that takes advantage of the new master holding all the correct descriptor state. In another example, all of the DMA rings are reset.

Creating a New Standby IO Controller Device

After a complete failover event has occurred, the system creates a new standby PCIe configuration. This may be the result of an IOM board replacement or similar upgrade event. Once the new standby IOM comes online, it will start to receive any PCIe broadcast configuration cycles from the IO failover device 100. However, most of the configuration cycles will have no meaning to the new standby IO controller device because it has no context of PCIe configuration, including BDFs and BARs. The new standby IO controller device receives a PCIe configuration update from its active peer. This update is via the mailbox 144 or the eDMA engine 146 (FIG. 1) in the IO failover device 100. Regardless, once the new standby IO controller device has synchronized its configuration with the active IO controller device, it can rely on the PCIe configuration broadcast mechanism to stay in sync.

Failover of Attached PCI IO Virtualization (IOV) Devices

An IO controller device may contain an attached PCI IO Virtualization (IOV) device, with its functions distributed to different servers. If a failover event occurs with active PCI IOV devices, the standby IO controller device can imitate the PCI configuration state but will be unable to failover the internal state of the IOV functions. The standby function may be set into an active state while the host driver is running. Another solution is to virtualize PCI IOV devices via proxy drivers running between the host servers and the processor of the IO controller device.

Losing Both IO Controller Devices

If the IO failover device detects that both IO controller devices are missing or failed, the IO failover device will attempt to keep the host OS alive and operating normally until at least one working IO controller device is inserted. When both IO controller devices are lost, the IO failover device responds to host reads according to its canned response TCAM rules. This TCAM is configured by the active IO controller device during vNIC configuration time. Each TCAM entry specifies an address range and appropriate response. If no TCAM entries match a read, the IO failover device will respond with a standard PCIe error response. Another solution to maintaining host visibility of the PCIe tree when both IO controller devices have failed is to have the embedded CPU 122 in the IO failover device 100 create responses to configuration cycles which match the last known state of the PCIe tree.

When a working IO controller device is inserted after a dual failure, the goal is to recreate the PCIe configuration that existed prior to the failures. The IO failover device will have sufficient state in its local SRAM for the new IO controller device to read and recreate the identical configuration. Once the IO controller device has completed its local configuration process, it will write a control bit in the IO failover device that clears the dual fail state and forwards new PCIe transactions to the working IO controller device in the ordinary manner. The working IO controller device will also signal the host drivers that the vNICs are once again operational.

PCIe Fabric Extender (FEX) Support

Figure 9:
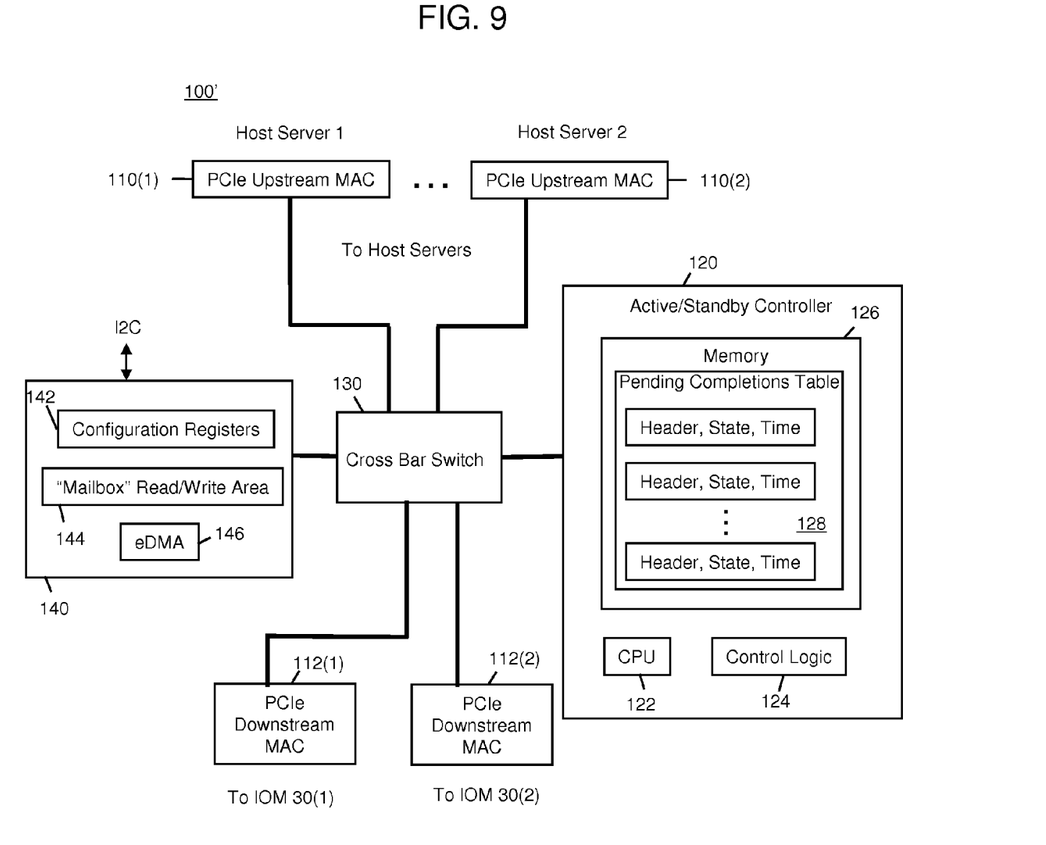
FIG. 9 is block diagram illustrating another form of the input/output failover device in which connections are made to multiple host computing devices.

Reference is now made to FIG. 9. The IO failover device 100' is similar to IO failover device 100 shown in FIG. 2 except that the host facing PCIe upstream MAC 110 is replaced with multiple ports (with fewer number of lanes) to couple to a respective one of a plurality of host servers. For example, if the host facing PCI switch MAC has 8 lanes, two 4 lane upstream MACs 110(1) and 110(2) may be used instead to independently connect to two host servers. This allows two independent host servers to attach to a single IO failover device allowing both attached servers to benefit from the failover features of the IO failover device. The end result is a higher server density with a single IO controller device, although in this configuration each host server has a smaller PCIe connection to its IO subsystem. In general, a single MAC may be replaced with N MAC controllers (with smaller number of lanes) to connect to a single IO failover device.

When the IO failover device connects to multiple host servers, then the broadcasting, receiving and forwarding operation depicted at 212, 214 and 216 in FIG. 4 are performed for transactions between at least two host servers (computing devices) and the first and second IO controller devices 50(1) and 50(2). Again, to generalize, the failover device may comprise a plurality of upstream MACs (interface ports) each of which is to couple to a corresponding one of a plurality of host computing devices each of which hosts one or more processes, and the failover device performs its operations for transactions between respective ones of the plurality of host computing devices and the first and second IO controller devices.

When a PCIe transaction is sent to and from an IO controller device, each transaction is marked as originating from one of the multiple host ports. This marking is done in a similar way to the active/standby marking done by the redundant IO controller devices for upstream transactions, using PCIe reserved bits.

In summary, the IO failover device described herein brings the high availability of redundant PCIe controllers to commodity servers without requiring OS modification. This capability is particularly important when multiple servers share a consolidated IO access node.

The IO failover device maintains identical PCIe configurations in the attached virtual IO controller devices by broadcasting configuration cycles and control register writes to both IO controller devices. While the configurations of vNICs are identical and all OS accesses to the configuration space will return identical results, the state of a vNIC will not be identical. The virtualized IO controller device that contains the currently active vNIC will send and receive packets, advance DMA control state, and perform other actions that will cause it to diverge from the standby vNIC. On a failover event, the vNIC driver running in the host server will receive signals from the newly active virtualized IO controller indicating that it must reset its DMA ring state before continuing. This is well within the normal driver operation as the driver may either re-post its entire DMA ring or simply update the ring pointers to their current values before continuing. Again, as explained herein, the OS need not be informed that a failover occurred.

If one of the virtualized IO controllers fails to respond to a host transaction, the IO failover device declares a failure and accepts the response from the redundant virtualized IO controller device. Physical link down events and link error events will also trigger a failover event.

The IO failover device maintains a copy of the PCIe configuration space in its local memory. When a virtualized IO controller device is removed and replaced, the newly inserted IO controller device can read the current IO configuration directly from the failover ASIC, synchronizing its IO configuration state so that it may act as a standby vNIC in the live IO topology. If both virtualized IO controller devices are removed, the IO failover device will attempt to keep the server OS alive with canned responses to configuration cycles which match the current IO configuration. When a replacement virtual IO controller device is inserted later, it can read the required PCIe configuration from the IO failover device's memory and resume operation as soon as it is synchronized.

The IO failover device and related techniques described herein provide electrical and functional fault isolation and redundancy to servers based on commodity CPUs and operating systems. Failover events are completely transparent to the operating system, allowing IO subsystems to be replaced and serviced on a running server. Moreover, the IO failover device operates within the PCIe standard, requiring no extensions to the standard.

The above description is intended by way of example only.

What is claimed is:

1. A method comprising:
at a failover device that connects redundant first and second virtualized input/output controller devices each comprising multiple virtual network interfaces that are in an active or standby state at any given time, to a computing device that hosts one or more processes, broadcasting transactions in accordance with a computer expansion card standard initiated from the computing device to the first and second virtualized input/output controller devices, wherein the failover device is separate and independent from the first and second virtualized input/output controller devices and the computing device;
receiving, at the failover device, signals associated with upstream transaction completions in accordance with the computer expansion card standard for both active and standby virtual network interfaces on the first and second virtualized input/output controller devices; and
forwarding, by the failover device, signals associated with upstream transaction completions for active virtual network interfaces on the first and second virtualized input/output controller devices to the computing device.

2. The method of claim 1, and further comprising forwarding by the failover device, tree information generated in accordance with the computer expansion card standard by the computing device during boot time to the first and second virtualized input/output controller devices.

3. The method of claim 1, in response to a failover event for the first virtualized input/output controller device, remapping, by the failover device, virtual network interfaces that were in an active state on the first virtualized input/output controller device prior to the failover event to virtual network interfaces that were in a standby state the second virtualized input/output controller device prior to the failover event.

4. The method of claim 3, wherein in response to the failover event of the first virtualized input/output controller device, forwarding, by the failover device, signals associated with upstream transaction completions for standby virtual network interfaces from the second virtualized input/output controller device to the computing device so that one or more virtual network interfaces on the second input/output controller device are changed from the standby state to the active state so as to replace one or more virtual network interfaces on the first input/output controller device.

5. The method of claim 3, wherein in response to the failover event of the first virtualized input/output controller device, further comprising sending, by the failover device, a downstream transaction in accordance with the computer expansion card standard to notify the second virtualized input/output controller device that it is the working virtualized input/output controller device so that the second virtualized input/output controller device changes the status of one or more virtual network interface devices previously in the standby state to the active state and enables all direct memory access rings that were previously disabled due to a standby status.

6. The method of claim 5, and further comprising storing in the failover device data representing pending transaction completions with respect to virtual network interfaces on the first and second virtualized input/output controller devices, and for any pending transaction completion for a standby virtual network interface, forwarding the corresponding response to the computing device.

7. The method of claim 1, wherein broadcasting, receiving and forwarding are performed by the failover device for transactions between at least two computing devices and the first and second virtualized input/output controller devices.

8. The method of claim 1, and further comprising generating a failover event in response to one or more of: loss of link at a downstream port to the first or second virtualized input/output controller device, failure to receive a response to a pending transaction completion from the first or second virtualized input/output controller device, and receiving an explicit failover message from the first or second virtualized input/output controller device.

9. The method of claim 1, and further comprising storing in the failover device data representing states of the first and second input/output controller devices to allow the first and second input/output devices to synchronize their states.

10. The method of claim 1, and further comprising, upon failover of a first physical device connected to the first virtualized input/output controller device, directing, by the failover device, signals associated with transactions for the first physical device to the second virtualized input/output controller device where a similar second physical device is connected.

11. An apparatus comprising:
first and second downstream interface ports configured to couple to redundant first and second virtualized input/output controller devices each comprising multiple virtual network interfaces that are in an active or standby state at any given time;
an upstream interface port configured to couple to a computing device that hosts one or more processes, wherein the apparatus is separate and independent from the first and second virtualized input/output controller devices and the computing device;
a switch coupled between the first and second upstream interface ports and the downstream interface port, wherein the switch is configured to direct signals between the third switch interface port and the first and second switch interface ports;
a memory that is configured to store data representing pending transaction completions initiated from the computing device to the first and second virtualized input/output controller devices in accordance with a computer expansion card standard; and
a controller coupled to the switch and the memory, wherein the controller is configured to:
broadcast transactions in accordance with the computer expansion card standard initiated from the computing device to the first and second virtualized input/output controller devices;
receive signals associated with upstream transaction completions in accordance with the computer expansion card standard from both active and standby virtual network interface devices on the first and second virtualized input/output controller devices; and
forward signals associated with upstream transaction completions for active virtual network interfaces on the first and second virtualized input/output devices to the computing device.

12. The apparatus of claim 11, and further comprising a plurality of upstream interface ports each of which is to couple to a corresponding one of a plurality of computing devices each of which hosts one or more processes, and wherein the processor is configured to perform the broadcast, receive and forward operations for transactions between respective ones of the plurality of computing devices and the first and second virtualized input/output controller devices.

13. The apparatus of claim 11, wherein the controller is configured to, in response to a failover event for the first virtualized input/output controller device, re-map, by the failover device, virtual network interfaces that were in an active state on the first virtualized input/output controller device prior to the failover event to virtual network interfaces that were in a standby state the second virtualized input/output controller device prior to the failover event.

14. The apparatus of claim 13, wherein the controller is further configured to, in response to the failover event of the first virtualized input/output controller device, forward signals associated with upstream transaction completions from the second virtualized input/output controller device to the computing device so that one or more virtual network interfaces on the second input/output controller module are changed from the standby state to the active state so as to replace one or more virtual network interfaces on the first input/output controller device.

15. The apparatus of claim 13, wherein the controller is further configured to, in response to the failover event for the first virtualized input/output controller device, send a downstream transaction in accordance with the computer expansion card standard to notify the second virtualized input/output controller device that it is the working virtualized input/output controller device so that the second virtualized input/output controller device changes the status of its virtual network interface devices to an active state and enables all direct memory access rings that were previously disabled due to a standby status.

16. The apparatus of claim 15, wherein the controller is further configured to store in the memory data representing pending transaction completions with respect to virtual network interfaces on the first and second virtualized input/output controller devices, and for any pending transaction completion for a standby virtual network interface, forward the corresponding response to the computing device.

17. One or more non-transitory computer readable storage media encoded with software comprising computer executable instructions and when the software is executed operable to:
at a failover device that connects redundant first and second virtualized input/output controller devices each comprising multiple virtual network interfaces that are in an active or standby state at any given time to a computing device that hosts one or more processes, broadcast transactions in accordance with a computer expansion card standard initiated from the computing device to the first and second virtualized input/output controller devices, wherein the failover device is separate and independent from the first and second virtualized input/output controller devices and the computing device;
receive, at the failover device, signals associated with upstream transaction completions in accordance with the computer expansion card standard for both active and standby virtual network interfaces on the first and second virtualized input/output controller devices; and
forward, at the failover device, signals associated with upstream transaction completions for active virtual network interfaces on the first and second virtualized input/output controller devices to the computing device.

18. The non-transitory computer readable storage media of claim 17, and further comprising instructions that are operable at the failover device to, in response to a failover event for the first virtualized input/output controller device, re-map, by the failover device, virtual network interfaces that were in an active state on the first virtualized input/output controller device prior to the failover event to virtual network interfaces that were in a standby state the second virtualized input/output controller device prior to the failover event.

19. The non-transitory computer readable storage media of claim 17, and further comprising instructions that are operable at the failover device to, in response to the failover event of the first virtualized input/output controller device, forward signals associated with upstream transaction completions from the second virtualized input/output controller device to the computing device so that one or more virtual network interfaces on the second input/output controller device are made active to replace one or more virtual network interfaces on the first input/output controller device.

20. The non-transitory computer readable storage media of claim 17, and further comprising instructions that are operable at the failover device to, in response to the failover event of the first virtualized input/output controller device, send a downstream transaction in accordance with the computer expansion card standard to notify the second virtualized input/output controller device that it is the working virtualized input/output controller device so that the second virtualized input/output controller device changes the status of its virtual network interface devices to active state and enables all direct memory access rings that were previously disabled due to a standby status.

21. The non-transitory computer readable storage media of claim 20, and further comprising instructions that are operable to store in the failover device data representing pending transaction completions with respect to virtual network interfaces on the first and second virtualized input/output controller devices, and for any pending transaction completion for a standby virtual network interface, forward the corresponding response to the computing device.

22. The non-transitory computer readable storage media of claim 17, and further comprising instructions that are operable to store data in the failover device representing states of the first and second input/output controller devices to allow the first and second input/output devices to synchronize their states.

* * * * *

UNITED STATES PATENT AND TRADEMARK OFFICE
CERTIFICATE OF CORRECTION

PATENT NO. : 8,788,873 B2  
APPLICATION NO. : 13/086595  
DATED : July 22, 2014  
INVENTOR(S) : Galles et al.

Page 1 of 1

It is certified that error appears in the above-identified patent and that said Letters Patent is hereby corrected as shown below:

In the Claims

Col. 12, Claim 1, Line 10, remove the "," after time.

Signed and Sealed this  
Ninth Day of December, 2014

Michelle K. Lee  
*Deputy Director of the United States Patent and Trademark Office*